United States Patent [19]
Tanaka

[11] Patent Number: 5,228,636
[45] Date of Patent: Jul. 20, 1993

[54] TAPE CASSETTE
[75] Inventor: Masato Tanaka, Tokyo, Japan
[73] Assignee: Sony Corporation, Tokyo, Japan
[21] Appl. No.: 837,908
[22] Filed: Feb. 20, 1992
[30] Foreign Application Priority Data
Feb. 22, 1991 [JP] Japan .................... 3-048742
[51] Int. Cl.⁵ .................... A47B 81/06; A47F 1/04; G11B 23/023
[52] U.S. Cl. .................... 242/199; 206/387; 312/9.12; 312/9.29; 360/85; 360/132
[58] Field of Search ............... 242/199, 197; 312/9.12, 312/9.29, 9.32; 360/132, 95, 85; 206/387

[56] References Cited
U.S. PATENT DOCUMENTS

| | | | |
|---|---|---|---|
| 3,873,193 | 3/1975 | Iida et al. | 242/199 X |
| 4,589,609 | 5/1986 | Oishi et al. | 242/198 |
| 4,611,864 | 9/1986 | Yokota | 206/387 X |
| 4,933,796 | 6/1990 | Tanaka | 242/199 X |
| 5,043,832 | 8/1991 | Ueda et al. | 360/85 X |
| 5,121,276 | 6/1992 | Weeks et al. | 360/132 |
| 5,158,345 | 10/1992 | Baur | 312/9.12 X |

*Primary Examiner*—Daniel M. Yasich
*Attorney, Agent, or Firm*—Jay H. Maioli; Lewis H. Eslinger

[57] ABSTRACT

A tape cassette, which is one of a plurality stored in a cassette magazine and which is adapted when in use to be taken out of the cassette magazine by a cassette changer, has a rack gear portion formed on a lid attached to the front of a cassette housing. The rack gear portion is engaged by a driven pinion gear in a cassette pull-out device of the cassette changer.

9 Claims, 6 Drawing Sheets

TAPE CASSETTE

BACKGROUND OF THE INVENTION

1. Field of the Invention

The present invention relates to a mechanism for taking a tape cassette out of a cassette magazine, which is arranged to store a plurality of tape cassettes.

2. Description of the Related Art

There have recently been proposed miniature cassettes which are still smaller than tape cassettes generally sold on the market (for example, compact cassettes and microcassettes). Since such a miniature cassette is very small in external size, it is possible to lose it when it is kept separately. Therefore, a cassette changer system capable of keeping a plurality of tape cassettes together in a cassette magazine is proposed.

In the proposed system, at the time of recording/reproducing, the cassette magazine including tape cassettes is loaded into a recording/reproducing apparatus and, within the recording/reproducing apparatus, one tape cassette is automatically taken out of the cassette magazine by a cassette changer and mounted on a drive mechanism to be subjected to the recording or reproducing operation.

Neither conventional tape cassettes nor mechanisms for taking out the tape cassette from a cassette magazine, employing a simple structure, has yet been proposed, and this has been a problem in realizing an automatic tape cassette loading system that uses a cassette changer.

SUMMARY OF THE INVENTION

The present invention has been made in view of the above described situation. Accordingly, it is an object of the present invention to provide a cassette tape, which si adapted such that a plurality of the same are stored in a cassette magazine and adapted, when in use, to be taken out of the cassette magazine by a cassette changer. The cassette tape is provided with a rack gear portion, formed on a lid attached to the front of its cassette housing, with which a cassette pull-out means, such as a pinion gear arrangement provided on a cassette changer, engages.

By making it possible to pull out a tape cassette with its rack gear portion engaged with a cassette pull-out means, such as a pinion gear arrangement, the tape cassette is made compatible with to a cassette changer system and, in addition, it becomes possible to realize the cassette pull-out means in a simple structure.

DESCRIPTION OF THE PREFERRED EMBODIMENT

Figure 1:
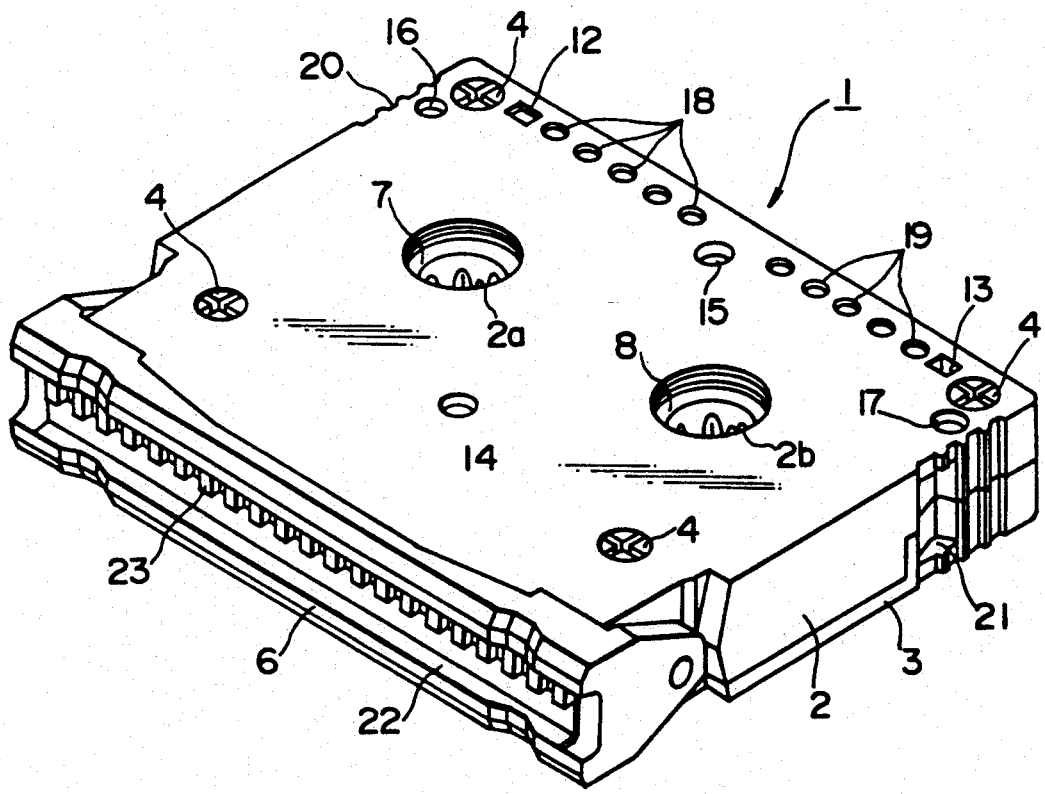
FIG. 1 is a perspective view of a tape cassette as an embodiment of the present invention.

An embodiment of a tape cassette according to the present invention will be described below with reference to FIG. 1 to FIG. 7. The tape cassette in the present example is that formed in a miniature size.

Referring to FIG. 1 to FIG. 4, reference numeral 1 denotes a tape cassette housing as a whole containing a magnetic tape for the recording/reproducing, for example, of a PCM signal. The cassette housing 1 is formed of an upper half 2 and a lower half 3, in confrontation with each other and fastened together by screws 4, and a lid 6 pivotally supported on the cassette housing for rotation for opening and shutting an opening portion 5 provided on the front side of the two halves 2 and 3.

Figure 3:
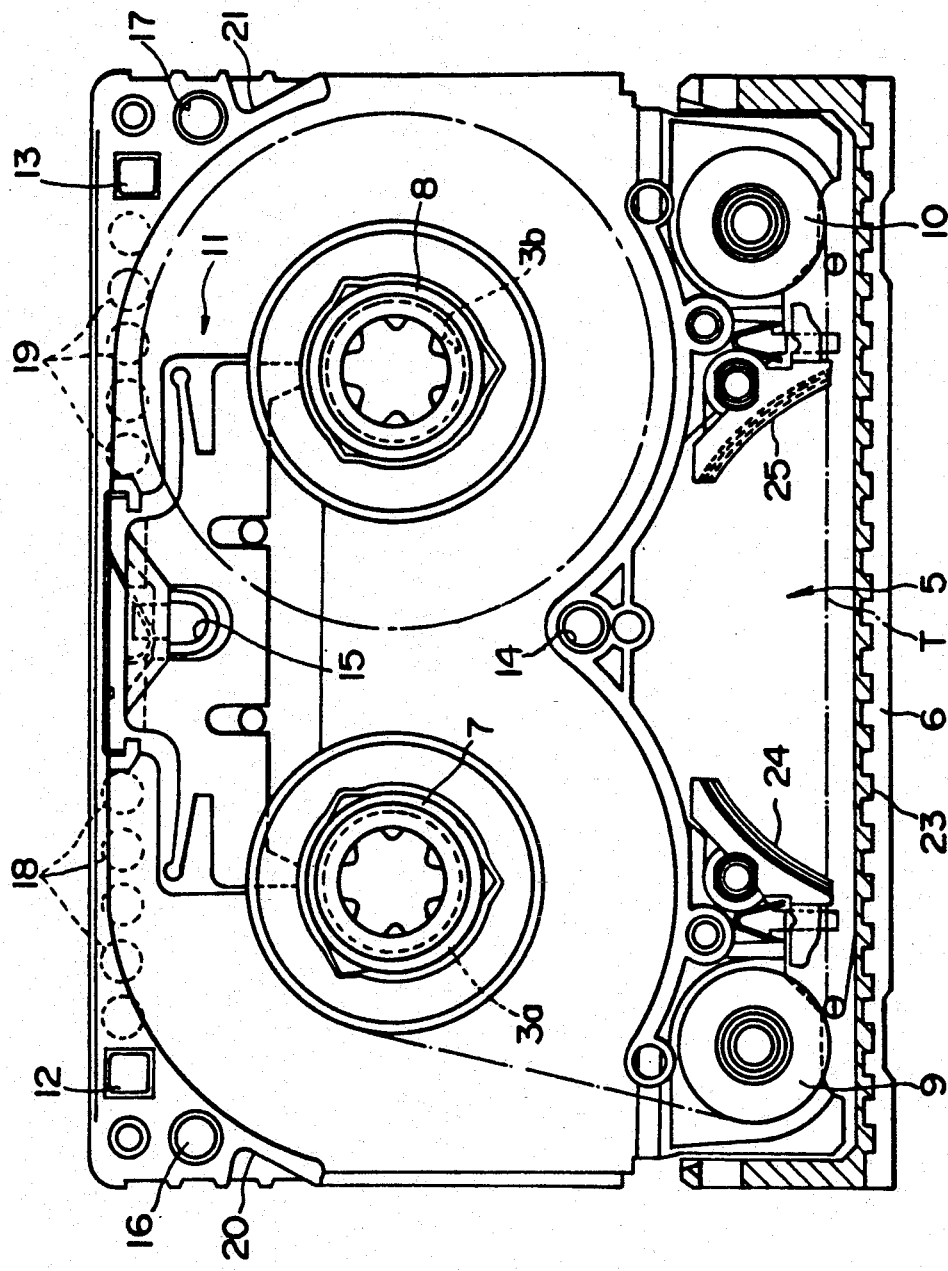
FIG. 3 is a plan view of the lower half side of the tape cassette of the embodiment.

Within the cassette housing 1, i.e., between the upper and lower halves 2 and 3, a pair of hubs 7 and 8 are disposed in positions corresponding to through holes 2a, 2b and 3a, 3b for hub driving shafts as shown in FIG. 3, and a magnetic tape T is wound around the hubs 7 and 8 with a portion thereof exposed to the outside through the opening portion 5 on the front side stretched by means of pinch rollers 9 and 10, which also serve as guide rollers, pivotally supported for rotation on both sides of the front opening portion 5.

Further, within the cassette housing 1, there is provided a braking mechanism 11 which acts as a brake for braking the hubs 7 and 8 when they are not in use. Further, on the upper and lower faces of the cassette housing, there are provided mechanisms 12 and 13, which prevent erroneous erasing, communicating with both the halves 2 and 3 on the left and right sides of the rear portion; reference holes 14, 15 and 16, 17 at the front center and rear center portions and on both sides of the rear portion; and a required number of inspection holes 18 and 19 arranged linearly along the rear edge portion. Further, there are provided grip portions 20 and 21 formed on both side faces toward the rear side.

Further, as seen from FIG. 1 and FIG. 2, on the lid 6 for opening and shutting the opening portion 5 on the front side of the cassette housing 1, there is provided a rack gear 23 along a guide groove 22 formed in the direction of the length at the cassette, which rack gear is used as an engagement means for a later described changer.

In the tape cassette arranged as described above, the magnetic tape T housed in the cassette housing 1 is subjected to helical-scan recording and reproducing by means of a rotary head.

Figure 2:
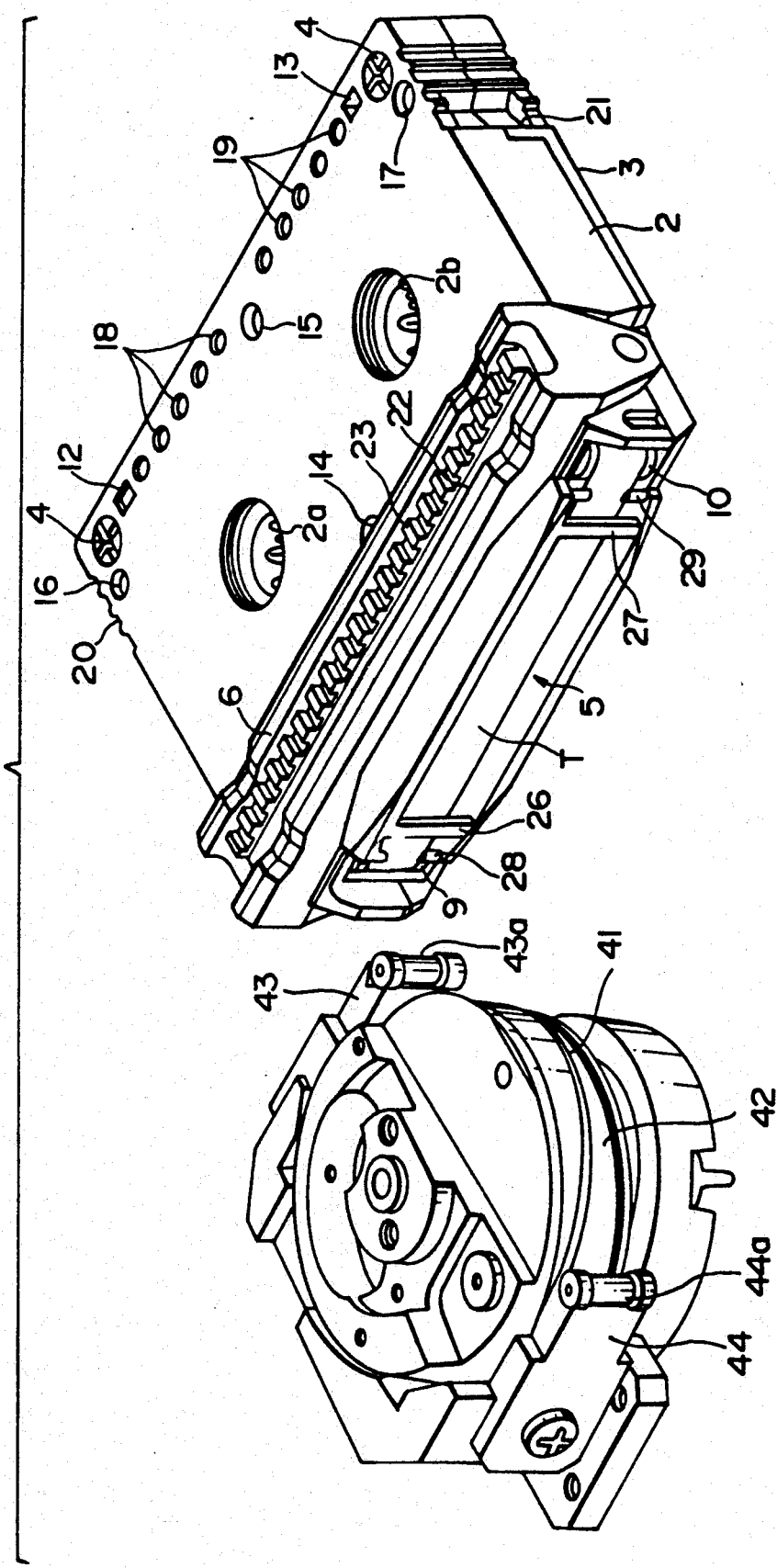
FIG. 2 is a perspective view showing the relationship between the tape cassette of the present embodiment and a head drum.

More specifically, as shown in FIG. 2, the rotary head 41 is adapted to be rotated at a required angle of inclination with respect to the head drum 42, and the head drum 42 is adapted to be partially inserted into the opening portion 5 on the front side of the cassette housing 1, which becomes hollow when the lid 6 is turned up or down, so that the magnetic tape T stretched over the opening portion 5 is allowed to slide along the curved peripheral surface of the inserted head drum 42, and thereby, sloped tracks obliquely crossing the magnetic tape T are formed thereon as the rotary head 41 rotates.

Figure 4:
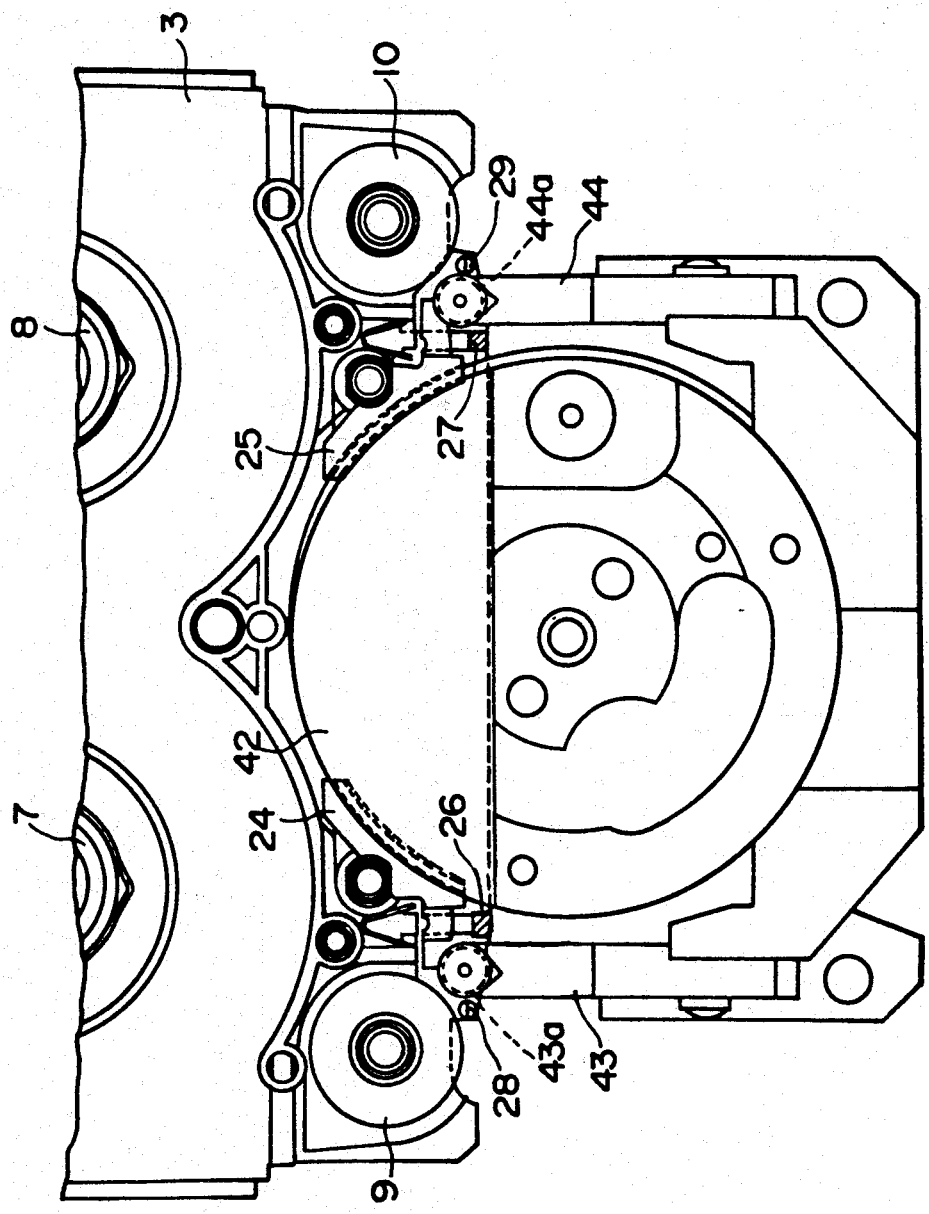
FIG. 4 is a plan view of a tape cassette of the embodiment with the head drum inserted therein.

To make sure that the magnetic tape T helically slides on the head drum 42 at that time, there are provided, in the present embodiment, a pair of tape guide members 24 and 25, whose guide members are slanted to opposite directions, disposed between the guide rollers 9 and 10 within the opening portion 5 of the cassette housing 1, in which the head drum 42 is inserted, so that the magnetic tape opposing the same can swing and travel sideways. Accordingly, by the insertion of the head drum 42 into the opening portion 5 as shown in FIG. 4, the tape guide members 24 and 25 are caused to abut the peripheral face of the head drum 42, so that the magnetic tape T is guided by the tape guide members 24 and 25 in a state sandwiched between the same and the peripheral face of the head drum 42.

Further, the head drum 42 has side wing guides 43 and 44 provided on both sides thereof, which are inserted between the pinch rollers 9 and 10 and the tape guide members 24 and 25 at both sides of the opening portion 5 of the cassette housing 1. The side wing guides 43 and 44 are provided, at the front ends thereof, with rollers 43a and 44a which are adapted to press the magnetic tape T against the tape guide members 24 and 25.

The side wing guides 43 and 44 are adapted to be placed in the opening portion 5 of the cassette housing 1 by being inserted between support pieces 26 and 27, slightly set back from the opening portion 5, and guide projections 28 and 29, which are positioned between the support pieces 26 and 27 and the pinch rollers 9 and 10, for preventing the tape from bulging out.

Since the tape cassette of the described structure is formed in a miniature size as described before (for example, the size of the cassette plane is 20 mm long and 30 mm broad, approximately), it is possible to lose the tape cassette when it is kept separately and, hence, a plurality of them are kept in a cassette magazine (described later) when they are not used.

The gear element and groove for use in moving the tape cassettes in the cassette magazine accurately and taking one out from the cassette magazine easily are provided on the lid 6 for opening and shutting the opening portion 5.

More specifically, the guide groove 22 formed in the front face of the lid 6 is arranged sideways and is shifted either upward or downward from the center of the lid 6 (downward in the present example). As described later, the direction of insertion of the tape cassette into the cassette magazine is controlled by the guide groove 22.

The rack gear 23 formed along the guide groove 22 is used for pulling a ape cassette out of the cassette magazine. In the present example, the rack is extended sideways between both ends of the lid 6 along the groove 22.

Figure 5:
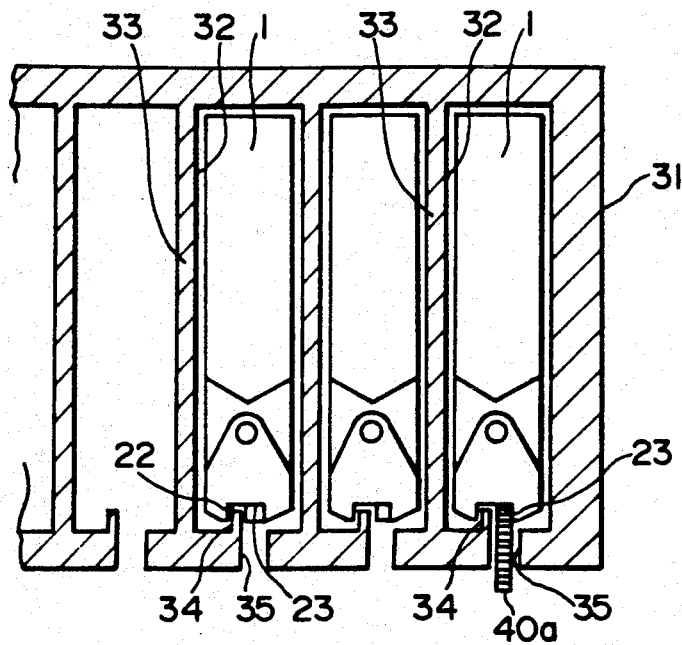
FIG. 5 is a sectional view of a cassette magazine with tape cassettes of the present embodiment stored therein.

FIG. 5 shows an example of a cassette magazine. The cassette magazine 31 has a plurality of store boxes 32 into which tape cassettes are inserted and stored sideways. Each store box 32 is separated from the adjoining one by a wall 33. On the bottom of each store box 32, there is formed an engagement ridge 34 in the direction of the depth. When a tape cassette is inserted into the store box, the guide groove 22 formed in the lid 6 is adapted to be engaged with the engagement ridge 34. When it is attempted to insert the tape cassette in the opposite direction, from its wrong side, the guide groove 22 does not correctly engage with the engagement ridge 34 because the guide groove 22 formed in the lid 6 is offset from the center and, hence, the insertion in the opposite direction of the tape cassette is prevented. Thus, the side A and side B of the inserted tape cassettes can be controlled to be in the prescribed direction.

In the bottom plate of each store box 32, there are formed, along the engagement ridge 34, groove holes 35, in which pull-out pinion gears 40a and 40b of a later described pull-out device 37 are inserted.

A plurality of tape cassettes stored in the cassette magazine structure as described above are inserted into a recording/reproducing apparatus as they are placed in the cassette magazine and, within the recording/reproducing apparatus, a specified tape cassette is automatically taken out from the cassette magazine by a cassette changer system and recording/reproducing is performed thereon.

Figure 6:
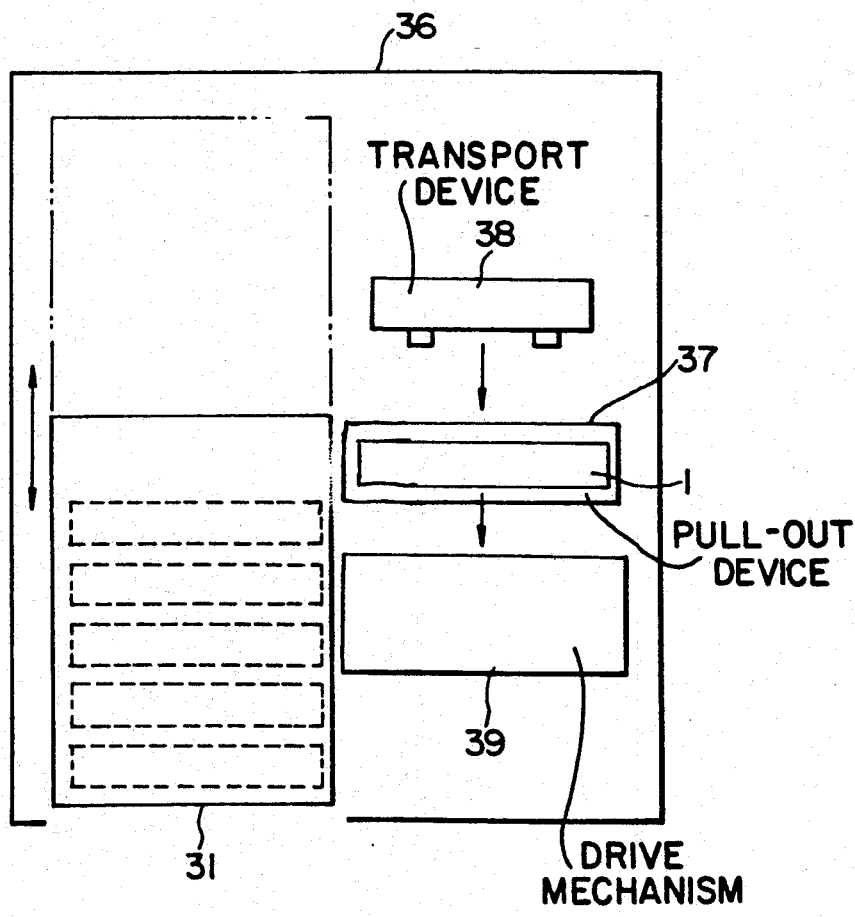
FIG. 6 is a schematic diagram of a cassette changer system.

FIG. 6 is a diagram schematically showing the structure of the cassette changer system. Referring to FIG. 6, reference numeral 36 denotes the recording/reproducing apparatus as a whole. When the cassette magazine 31 with a plurality of tape cassettes stored therein is inserted in the recording/reproduction apparatus 36, the cassette magazine 31 is moved by a specific shifting mechanism and one tape cassette is pulled out from a specified store box 32 by the pull-out device 37. The tape cassette taken out from the cassette magazine 31 as described above is then transported by a transport device 38 to a drive mechanism portion 39 and loaded therein with the lid 6 turned up or down and the opening portion 5 with the magnetic tape T stretched over it opened. Then, the rotary head 41 shown in FIG. 2 is inserted into the opening portion 5 as shown in FIG. 4 and a predetermined recording or reproducing operation is performed.

In the cassette changer system, the pull-out device 37 for taking the tape cassette out of the cassette magazine is formed of two units of pinion gears 40a and 40b rotationally drive for example by a rotational drive mechanism, not shown, and the two pinion gears 40a and 40b are associated with each other, for example, with a band passed around them and driven to rotate at equal speed.

Figure 7:
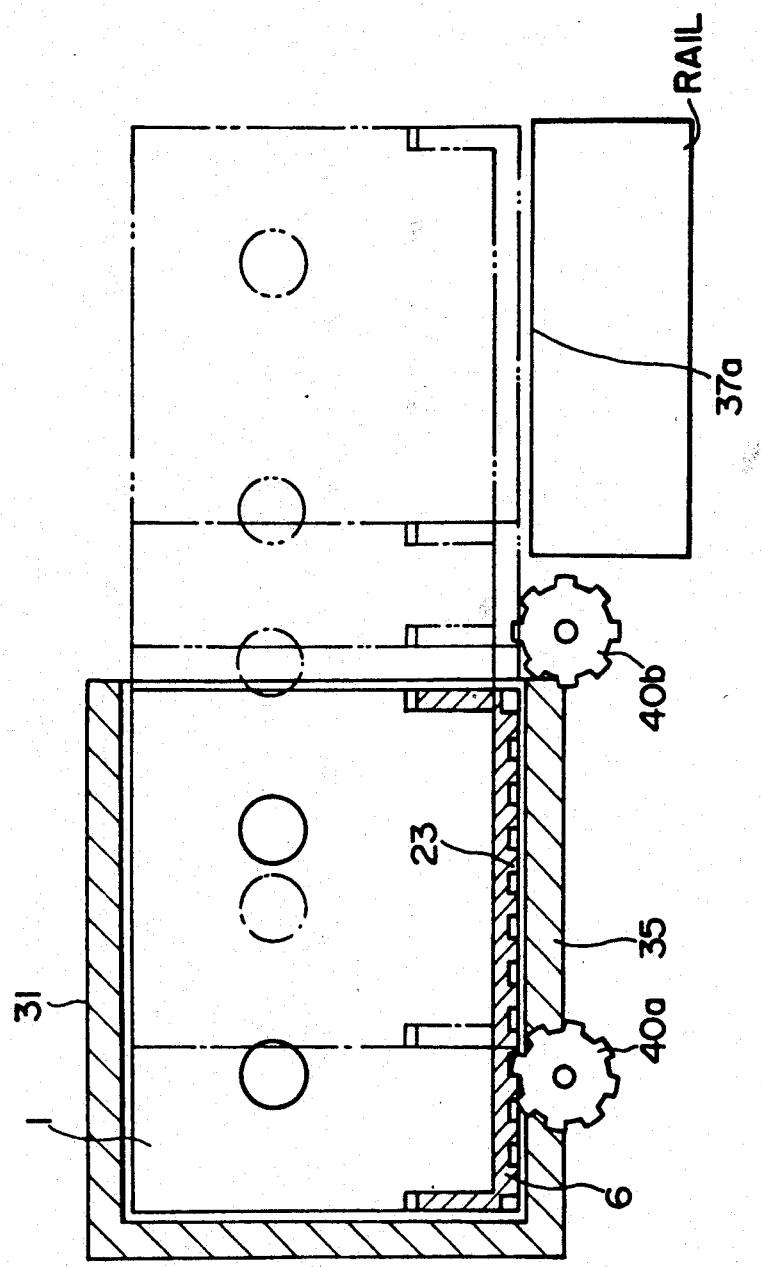
FIG. 7 is an explanatory drawing of the operation of pulling out a tape cassette of the embodiment from a cassette magazine.

When a tape cassette is to be pulled out from a specified store box, the pinion gears 40a and 40b engage with the rack gear 23 formed on the lid 6 of the tape cassette from below the store box 32, i.e., through the groove holes 35 as shown in FIG. 5 and FIG. 7. As the pinion gears 40a and 40b are rotationally driven by the drive mechanism, the tape cassette is pulled out as indicated by the one-dot chain line in FIG. 7 and let out for example to be placed on a rail 37a for transporting the tape cassette.

The tape cassette thus pulled out from the cassette magazine is transported by a transport device 38 of the cassette changer system to the drive mechanism portion 39 as described above and a recording or reproducing operation is performed thereon.

Since, as described above, the tape cassette of the present embodiment is provided on the front face of the lid 6 with a rack gear 23, with which the pinion gears 40a and 40b of the pull-out device of the cassette changer engages, the tape cassette can be easily taken out of the cassette magazine and thereby made applicable to the cassette changer system. Especially when the tape cassette of the present embodiment is used, the pull-out device on the cassette changer can be provided only by a mechanism which causes the pinion gears 40a and 40b to rotate while they are abutting on the rack gear 23. Therefore, such advantages are obtained that the structure of the pull-out device can be much simplified and a high-speed pull-out operation can be achieved.

Further, even when tape cassettes according to the present embodiment are stored for example in a cassette changer system designed to pull out a tape cassette using an arm member provided with an engagement claw for pulling out the tape cassette, the rack gear 23 can engage with the engagement claw of the arm member and, therefore, the present tape cassette can be satisfactorily applied to such cassette changer system.

Further, since the rack gear 23 is arranged to be formed on the lid 6 for the tape cassette of the present embodiment, the arrangement can be realized on conventional tape cassettes without making a large change in design. More specifically, when it is attempted to provide the rack gear 23 on the side of the cassette housing 1, since space in the cassette housing 1 is extremely limited, it becomes necessary to make great changes in design of the space for receiving the magnetic tape T, the arrangement of the various inspection holes, and so on, and to carry out very difficult designing work. However, since the arrangement in the present example is provided only by formation of the rack gear 23 on the front face of the lid 6, or, so to say, in vacant space, what is required is only to process the lid 6 as required and no change is required in the design of the cassette housing 1.

The present invention is not limited to the structure of the above described embodiment but can be widely applied to various cassettes other than miniature cassettes for PCM recording, such as video tape cassettes, DAT cassettes, etc. having a lid structure.

The tape cassette of the present invention as described in the foregoing has the rack gear, with which the pull-out means of the cassette changer, formed on the lid in front of the cassette housing engages, and therefore, such an effect can be obtained that it is applicable to a cassette changer system and facilitates pulling out of a tape. Such an effect can also be obtained that a very simple structure such as a pinion gear arrangement can be used as the pull-out means in the cassette changer system.

What is claimed is:

1. A tape cassette containing a tape comprising:
   a tape housing;
   a lid provided in a front side of said housing; and
   a rack gear portion formed on a front side of said lid to enable movement to and from a tape cassette magazine of a tape recording and/or reproducing apparatus.

2. A tape cassette according to claim 1, wherein said rack gear portion is formed along an entire length of said lid.

3. A tape cassette according to claim 1, wherein a guide groove is formed in said front side of said lid 4. A tape cassette according to claim 3, wherein said guide groove is offset from a center of said lid.

5. A tape cassette according to claim 3, wherein said rack gear portion is formed along said guide groove.

6. A cassette magazine for storing a plurality of tape cassettes, each having a lid provided in a front side of a housing thereof, a rack gear portion formed on said lid along a length thereof to enable movement to and from a tape cassette magazine of a tape recording and/or reproducing apparatus, and a guide groove formed in said lid along said length and offset from a center thereof, comprising:
   a plurality of store boxes in the cassette magazine for storing a respective plurality of said tape cassettes, and
   an engagement projection formed on a bottom of each of said plurality of store boxes, said engagement projection engaging said guide groove of said tape cassette when said tape cassette is stored in said store box.

7. A cassette magazine according to claim 6, wherein each of said store boxes is provided, in said bottom, with a groove hole arranged so that a pinion gear inserted therein engages said rack gear of said cassette.

8. A recording or reproducing apparatus using a tape cassette, said tape cassette having a lid provided in a front side of a housing and a rack gear portion provided on said lid along a length thereof, comprising:
   a tape drive mechanism in the recording or reproducing apparatus;
   a cassette pull-out device to pull a selected cassette out of a cassette magazine; and
   at least one pinion gear rotationally mounted on said pull-out device for engaging said rack gear portion of said tape cassette to thereby transport said tape cassette to said tape drive mechanism.

9. A recording or reproducing apparatus according to claim 8, further comprising:
   a cassette magazine having a store box formed with a groove hole in a bottom thereof, wherein said tape cassette is stored in said store box of said cassette magazine, and
   said rack gear portion of said tape cassette and said pinion gear of said recording or reproducing apparatus are arranged for engagement with each other through said groove hole provided in the bottom of said store box.

* * * * *

UNITED STATES PATENT AND TRADEMARK OFFICE
CERTIFICATE OF CORRECTION

PATENT NO. : 5,228,636
DATED      : July 20, 1993
INVENTOR(S): Masato Tanaka

It is certified that error appears in the above-indentified patent and that said Letters Patent is hereby corrected as shown below:

```
Col. 1, line 39, change "si" to --is--
        line 50, delete "to"
Col. 3, line 47, change "ape" to --tape--
Col. 4, line 34, change "drive" to --driven--
```

In the Claims:

```
Col. 6, line  5, after "lid" insert --along a length
        thereof.--
```

Signed and Sealed this

Twenty-seventh Day of September, 1994

Attest:

BRUCE LEHMAN

*Attesting Officer*     *Commissioner of Patents and Trademarks*